United States Patent
Ebert et al.

(10) Patent No.: US 9,266,743 B2
(45) Date of Patent: Feb. 23, 2016

(54) METHOD FOR PRODUCING A POROUS $SiO_2$-XEROGEL WITH A CHARACTERISTIC PORE SIZE BY MEANS OF A BOTTOM-UP METHOD USING A PRECURSOR THAT HAS ORGANIC SOLID SKELETAL SUPPORTS

(75) Inventors: Hans-Peter Ebert, Dettelbach (DE);
Theresa Noisser, Würzburg (DE);
Gudrun Reichenauer, Gerbrunn (DE);
Lena Weigold, Würzburg (DE)

(73) Assignees: BSH Hausgeraete GmbH, Munich (DE); Bayerisches Zentrum für Angewandte Energieforschung e. V., Würzburg (DE)

( * ) Notice: Subject to any disclaimer, the term of this patent is extended or adjusted under 35 U.S.C. 154(b) by 241 days.

(21) Appl. No.: 13/510,727

(22) PCT Filed: Nov. 19, 2010

(86) PCT No.: PCT/EP2010/067823
§ 371 (c)(1),
(2), (4) Date: May 31, 2012

(87) PCT Pub. No.: WO2011/061290
PCT Pub. Date: May 26, 2011

(65) Prior Publication Data
US 2012/0228545 A1 Sep. 13, 2012

(30) Foreign Application Priority Data
Nov. 19, 2009 (DE) .................. 10 2009 053 784

(51) Int. Cl.
C01B 33/16 (2006.01)
C08J 9/26 (2006.01)
(Continued)

(52) U.S. Cl.
CPC ............... *C01B 33/16* (2013.01); *C01B 33/163* (2013.01); *C01B 33/158* (2013.01); *C08J 9/26* (2013.01); *C08J 9/28* (2013.01)

(58) Field of Classification Search
CPC .......... C01B 33/16; C01B 33/158; C08J 9/26; C08J 9/28
USPC .......................... 423/338; 516/34, 77, 98, 111
See application file for complete search history.

(56) References Cited

U.S. PATENT DOCUMENTS 5,647,962 A    7/1997  Jansen et al.
5,656,195 A *  8/1997  Mielke et al. .................. 252/62

(Continued)

FOREIGN PATENT DOCUMENTS

DE    19631267 C1    4/1998
DE    19721600 A1    11/1998

(Continued)

OTHER PUBLICATIONS

International Search Report PCT/EP2010/067823.
Report of Examination including National Search Report dated Dec. 3, 2013.

(Continued)

*Primary Examiner* — Matthew E Hoban
*Assistant Examiner* — James Fiorito
(74) *Attorney, Agent, or Firm* — James E. Howard; Andre Pallapies

(57) ABSTRACT

In a method for producing a porous $SiO_2$-xerogel starting solution containing a silicon compound is provided and organic monomers and an organically modified alkoxysilane are added to the starting solution. During gelification of the silicon compound, the organic monomers and the organically modified alkoxysilane react in situ to form organic solid skeletal supports in the silicon network. The resulting gel is dried under subcritical conditions and the solid skeletal supports removed by thermal oxidation.

21 Claims, 3 Drawing Sheets

(51) Int. Cl.
  *C08J 9/28* (2006.01)
  *C01B 33/158* (2006.01)

(56) References Cited

U.S. PATENT DOCUMENTS

| | | | |
|---|---|---|---|
| 5,888,425 | A | 3/1999 | Schwertfeger et al. |
| 7,024,890 | B2* | 4/2006 | Costa et al. .................... 65/395 |
| 2003/0021820 | A1 | 1/2003 | Ahola et al. |
| 2006/0069171 | A1* | 3/2006 | Prokopowicz et al. ......... 521/61 |
| 2006/0199455 | A1* | 9/2006 | Stepanian et al. .............. 442/59 |
| 2008/0188575 | A1* | 8/2008 | Gaspar Martinho et al. . 516/111 |
| 2010/0019188 | A1* | 1/2010 | Warren et al. .......... 252/62.51 R |

FOREIGN PATENT DOCUMENTS

| | | |
|---|---|---|
| WO | 9805591 A1 | 2/1998 |
| WO | 03055827 A1 | 7/2003 |
| WO | 2005068361 A2 | 7/2005 |

OTHER PUBLICATIONS

Cedric J. Gommes et al, Journal of Physical Chemistry B vol. 110 pp. 7757-7765, "Structure of Silicia Xerogels . . . ", Issued Mar. 29, 2006.
Mary Ann B. Meador et al., Chemistry materials vo. 17, pp. 1085-1098, "Cross-Linking Amine-Modified Silica . . . ", Issued Feb. 11, 2005.
Report of Examination RU 2012122640.

* cited by examiner

METHOD FOR PRODUCING A POROUS SIO₂-XEROGEL WITH A CHARACTERISTIC PORE SIZE BY MEANS OF A BOTTOM-UP METHOD USING A PRECURSOR THAT HAS ORGANIC SOLID SKELETAL SUPPORTS

BACKGROUND OF THE INVENTION

This invention relates to a method for producing a porous $SiO_2$ xerogel with a characteristic pore size of less than 1 micrometer using temporary organic solid skeletal supports, which are removed by thermal oxidation at the end of the production process by means of a sol-gel process with subcritical drying of the gel. The additional organic particles, or macromolecules, in the inorganic gel prevent a collapse of the inorganic network during the subcritical drying process. These organic solid skeletal supports are subsequently oxidatively removed as far as possible by heat treatment in excess of 300° C. The result is a $SiO_2$ xerogel (having a fiber content of <5% by weight) with a porosity >80%, a carbon content of less than 10%, which is not or is only weakly chemically bound to the silicate structure, and pores in the range of less than 1 micrometer.

Aerogels, cryogels and xerogels are used in many areas. The aforementioned materials are basically differentiated by the type of drying method. Aerogel is a generic term for all gels having a low solids content, the pores of which are filled with air, but in a narrower sense they are also defined by a supercritical drying process, cryogels by freeze drying and xerogels by convective subcritical drying.

With regard to the present aerogel according to the invention, this is therefore strictly speaking a xerogel throughout.

As a result of their extremely low densities and their high porosities of typically 85% and greater, silica aerogels are excellent insulating materials which in contrast to organic materials can also be used at high temperatures. In the case of non-evacuated materials, above 250° C. organic components would combust with the oxygen present in the air.

The production of highly porous solids by means of sol-gel methods normally requires a supercritical drying step in order to obtain the pore structure. This drying is on the one hand demanding in terms of time and resources because as a general rule the solvent in the pores first needs to be exchanged. On the other hand, it is energy intensive because autoclaves operate at high pressure. Processing in an autoclave is also disadvantageous from the process engineering viewpoint on account of its non-continuous nature (batch processing). Due to the great capillary forces occurring, convective drying at 1 bar (subcritical drying) results in the collapse of the pore structure, which is why monolithic materials having a high porosity can only be produced with difficulty. This means that xerogels exhibit higher densities and therefore also inferior thermal insulation properties compared with aerogels.

The aerogel produced in [WO2005068361] must be dried supercritically and is thus expensive and complex to produce.

In order to avoid the supercritical drying and nevertheless achieve low densities there are several general approaches. Einarsrud et al. have developed a method which reduces the shrinkage occurring during subcritical drying through a stiffening of the gel structure in the wet gel [Einarsrud, M. A., E. Nilsen, A. Rigacci, G. M. Pajonk, S. Buathier, D. Valette, M. Durant, B. Chevalier, P. Nitz, and F. Ehrburger-Dolle, *Strengthening of silica gels and aerogels by washing and aging processes*. Journal of Non-Crystalline Solids, 285 (2001) 1-7]. However, in spite of the low density of the resulting xerogel the solid-body heat conduction is increased when using this method because locally the contacts between the silica particles in the gel structure are systematically increased.

A further disadvantage are the additionally required method steps which comprise two time-consuming solvent exchange steps and the long times which are required for crack-free drying of macroscopic molded bodies.

In order to prevent a cross-linking of the surface hydroxy groups (in the case of compression of the gel by the capillary forces) during drying and thus an irreversible shrinkage, these groups can be converted using a silylating agent as in [EP0690023A2], WO9805591A1 or WO96022942A1. This method does however always signify a further protracted solvent exchange and a further synthesis step and does not prevent the large temporary shrinkage of the sample during the subcritical drying which particularly in the case of molded bodies having dimensions in the cm range and greater can easily result in the formation of cracks or requires very slow drying. These silylated hydrophobized gels cannot be used with application temperatures in excess of 250° C. because otherwise the organic surface groups are destroyed and the desired effect, such as for example the hydrophobia in the case of WO9805591A1, is thus also destroyed.

BRIEF SUMMARY OF THE INVENTION

The object of the invention is the production of a porous $SiO_2$ xerogel which both exhibits the low density of an aerogel and thus also has a correspondingly low thermal conductivity, and also can be used at temperatures in excess of 300° C., and which exhibits a good mechanical stability (modulus of elasticity greater than 5 MPa). Production takes place by means of subcritical drying.

In order to achieve a low density and a low thermal conductivity in the case of xerogels, in other words subcritically dried gels, according to the invention an intermediate product, or a precursor, in other words a $SiO_2$ xerogel having spheroidal organic particles, is produced in the $SiO_2$ network. A component which has an ash content of less than 20% by weight is referred to in the following as an organic component.

The inorganic network (1) with the organic components as solid skeletal supports (2) is shown schematically in FIG. 1. In this situation, the particle size must be in the range of the $SiO_2$ particles (FIG. 1; left).

By means of a following oxidation step (3), these organic components are removed as far as possible from the solid skeleton (FIG. 1; right) Imperfections formed as a result of oxidation are identified by (4), residual non-silicate components due to non-removal by oxidation are identified in each case by (5).

Aerogels consist of three-dimensionally networked chains of spheroidal primary particles in the nanometer range. The overall thermal conductivity in silica aerogels is determined by three factors: gas, radiant and solid-body heat conduction. Since silica aerogels are almost completely transparent to IR radiation, the transfer of heat by radiation should not be disregarded for them particularly at higher temperatures ($\sim T^3$). This contribution can be sufficiently reduced through the addition or integration of opacifying agents (=pigments) or through the use of boundaries with a low radiation emission (low-e boundaries). Aerogels and xerogels generally exhibit a high optical transparency. For applications which require no optical transmittance, such as opaque insulation materials, it is possible to dispense specifically with the optical transparency; the incorporation of components which reduce the transmittance of the material in the infrared wavelength range and thereby also lessen the heat transport by radiation also results as a general rule in an optical dimming of the material due to absorption or diffusion. In order that the radiation transport is effectively suppressed, according to the invention xerogels also having a low transparency in the visible spectral range are preferred.

The contribution of the gas heat conduction is created by heat transfer occurring during collisions between gas molecules in the pores. With pore diameters of less than 1 micrometer this contribution can be greatly reduced because the probability of collisions between the gas molecules decreases as the pore size decreases. As the pore size decreases, for a given density of the gel structure the shrinkage of the sample occurring during the subcritical drying and thereby also the density of the resulting xerogel increases as a result of capillary forces. The greater density of the material increases the contribution of the solid-body conduction. The aim therefore is to generate pore sizes in the material smaller than 1000 nm, as far as possible even smaller than 300 nm, and to achieve a xerogel of sufficiently low density (less than 400 kg/m$^3$) in spite of subcritical drying and dispensing with solvent exchange. In order to withstand the capillary pressure during the subcritical drying and thus to counteract a collapse of the network or an irreversible shrinkage, according to the invention an organic spheroidal component (proportion less than 20% by weight) is required as a mechanical support in the chains of the silica network.

The present invention relates to a xerogel which is produced from a silicate compound, for example a silicon alkoxide (for example TMOS or TEOS) or sodium silicate in an acid or base medium, and for which are generated in situ in the starting solution or the sol phase appropriate organic constituents, such as for example organic macromolecules (for example hydrocarbons, epoxides, amines, polyesters, polyimides, polyurethanes, proteins). An even distribution of the constituents throughout all the material is thereby ensured. During the gelification the SiO$_2$ network (1) is formed together with the organic particles (2). These spheroidal particles (2) are therefore chemically linked to the network (1). These spheroidal organic particles are used as temporary solid skeletal supports and are oxidatively removed (3) after drying of the gel has taken place, as a result whereof imperfections (4) of an adjustable size arise in the inorganic network. These organic supports, which ensure the mechanical stability of the xerogel during the drying process, lower the proportion of solid-body heat conduction in the silica xerogel on account of their absence after being burned out because no further solid-body heat transfer takes place at these locations. At the same time a slight carbon residue (5) (<10%) in the material, produced from the organic particles as a result of pyrolysis, which in spite of heat treatment cannot be removed from the SiO$_2$ network or specifically remains there, contributes to an IR dimming of the material. This results in a reduction in the radiation heat conduction which, particularly at high temperatures, makes a not inconsiderable contribution of for example 30% to 50% at 0° C. up to 90% at 170° C. to the overall thermal conductivity in silica xerogels.

The production of the SiO$_2$ xerogel with organic particles in the network takes place here according to the invention using a "bottom-up" method.

With regard to "bottom-up" methods, these are based on molecular precursors and the desired particles are constructed in situ. In order to provide mechanical support for the structure, an organic polymer is constructed here in the network. The appropriate organic monomers and additives are added to the starting solution or the liquid inorganic sol phase. The monomers are chosen such that a good solubility is ensured. This happens either through the suitable choice of the monomers or by employing linker groups in order to link the synthesized polymer covalently to the network. This is achieved according to the invention by the fact that the surface of the silica sol particles is provided in situ with appropriate functional groups. If the modified organic particles generated in situ are converted with a simple silica precursor such as for example TEOS or TMOS, corresponding chains consisting of inorganic primary particles are formed alternating with organic particles, the stability of the gel structure is increased by means of additional organic/inorganic networking. Additional pigments can be incorporated both during the sol-gel process and also subsequently into the wet gel.

Following the synthesis and the subcritical drying of the material, an inorganic xerogel with organic particles is then present in the network prior to the subsequent heat treatment. The density of this xerogel lies between 150 kg/m$^3$ and 600 kg/m$^3$ and the temporary content by volume of organic particles is between 10% and 60%.

According to the invention, the xerogel is subjected to a heat treatment in excess of 300° C. In this associated method step, the organic particles are removed as far as possible from the gel structure and thus leave behind imperfections in the solid skeleton which contribute significantly to a reduction in the overall thermal conductivity by reducing the solid-body conduction.

The silica xerogel produced according to the invention exhibits the following properties:
The pore sizes range between 1000 nm and 50 nm, the density ranges between 400 kg/m$^3$ and 100 kg/m$^3$. The determination of the mean size d of the pores is effected from the macroscopic density of the xerogel ρ and the specific external surface $S_{ext}$. In this situation, $S_{ext}$ is calculated as the difference between the specific surface according to the BET method $S_{BET}$ (ISO 9277:1995 and DIN 66135-2:2001-06) and the specific micropore surface $S_{Mik}$ (ISO15901-3); d is thus given by $d=4\cdot(1/\rho-1/\rho_{SiO2})/S_{ext}$, where ρ is the macroscopic density of the molded body and $\rho_{SiO2}$ is the density of non-porous amorphous SiO$_2$ glass (=2.2 g/cm$^3$). In the case of bimodal pore distributions in which the diameter of a group of pores lies below 100 nm, the pore distribution of the pores <100 nm is determined using BJH analysis of the nitrogen sorption isotherms according to the DIN 66134 (1998-02) Standard; the corresponding mean value is referred to as d". The mean size of the pores >100 nm d' is given by the difference between overall pore volume $V_{P,Gesamt}=(1/\rho-1/\rho_{SiO2})$ and the pore volume $V_{p,<100}$ of the pores smaller than 100 nm which is determined according to the Gurvich rule from the measured isotherms, and also the difference between external surface $S_{ext}$ and the external surface of the pores smaller than 100 nm $$S_{ext,<100}=4*(V_{p,<100})/d' \text{ as}$$

$$d=4\cdot(V_{P,Gesamt}-V_{p,100})/(S_{ext}-S_{ext,<100}).$$

In the case of bimodal distributions with pores >100 nm, the distribution is determined with the aid of mercury porosimetry (ISO 15901-1).

The Rosseland mean IR extinction at 300 K is at least 50 m$^2$/g without pigments and at least 80 m$^2$/kg with pigments (spectral averaging interval of 1.4 µm to 35.0 µm). The value is ascertained by determining the direct hemispherical transmission and reflexion in the wavelength range from 1.4 µm to 35.0 µm.

The mechanical stability is characterized by a modulus of elasticity >5 MPa. The modulus of elasticity can be determined either by means of a static method in which the relative change in length ΔL/L of the sample is determined at unidirectional pressure p:

$$E = \frac{p}{\Delta L / L}$$

Alternatively, the modulus of elasticity can be calculated from the sound velocity v in accordance with $E=v^2\rho$ with the density $\rho$.

DETAILED DESCRIPTION OF EXEMPLARY EMBODIMENTS OF THE PRESENT INVENTION

Figure 1:
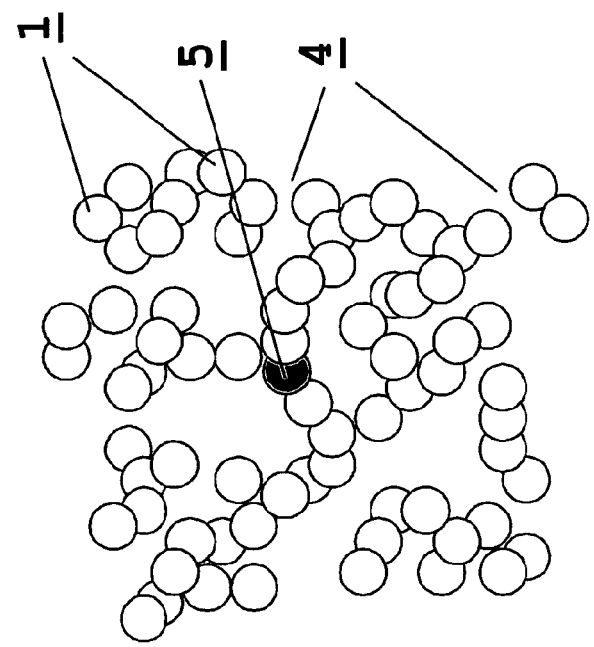
FIG. 1 shows on the left-hand side a $SiO_2$ network before oxidation and on the right-hand side the $SiO_2$ network after oxidation.
Figure 1:
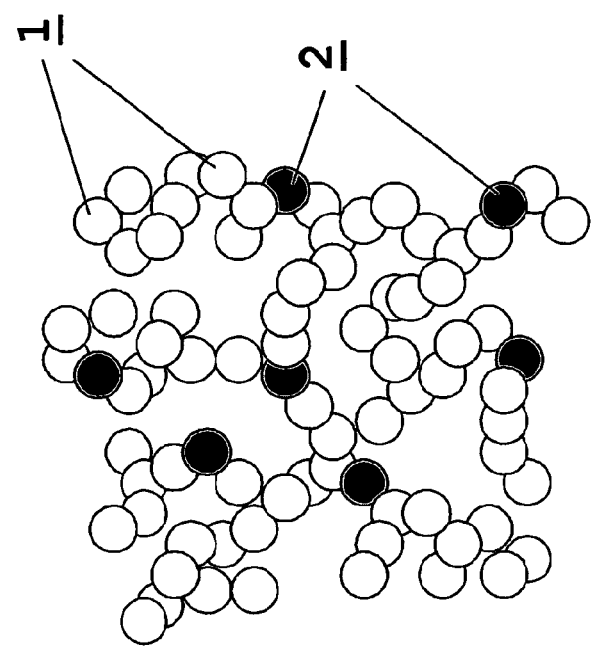
Figure 2:
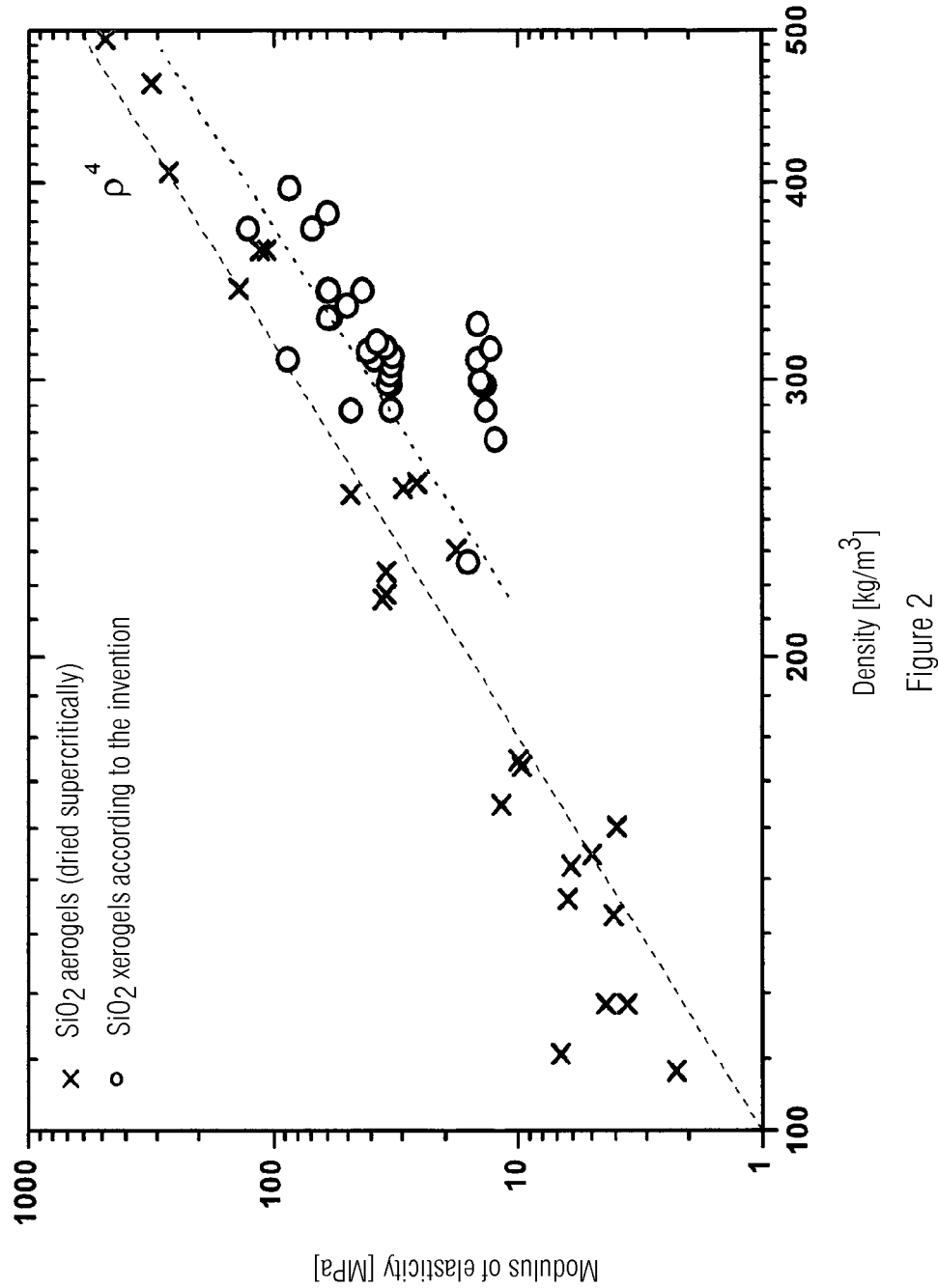
FIG. 2 is a graph showing the relation between modulus of elasticity and density for SiO2 aerogels and SiO2 xerogels according to the invention.
Figure 3:
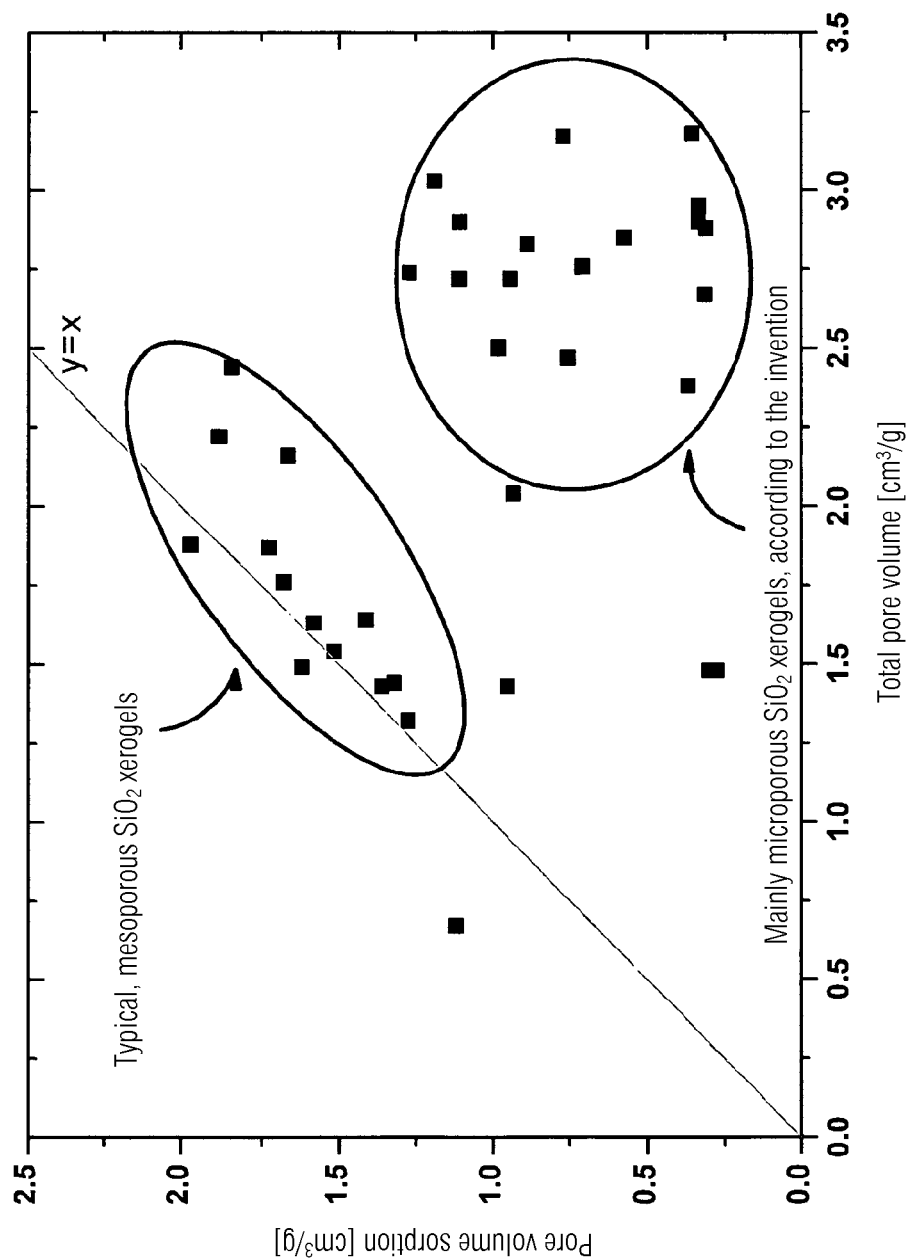
FIG. 3 is a graph showing the relation between pore volume sorption and total pore volume.

Examples of moduli of elasticity and pore diameters of the $SiO_2$ xerogels according to the invention having solid skeletal support are shown in FIG. 2 and FIG. 3.

EXAMPLES

For the method according to the invention, basically all the polymer, polycondensate or polyadduct precursors (=monomers) or copolymer, cocondensate or coadduct precursors which can be networked herein, for example monomers for resorcinol-formaldehyde resins, hydrocarbons, epoxides, amines, polyesters, polyimides, polyurethanes or proteins, which are soluble in polar protic solvents (preferably mixtures of water and an alcohol, here preferably ethanol), are suitable.

By preference, monomers or mixtures thereof are selected which polymerize or condense as a result of setting the pH value and the temperature in the same range as the inorganic network.

In addition to catalysts, additives are all the substances which increase the dispersibility or solubility of the organic polymer particles or of the carbon particles by means of physical or chemical bonds, for example also solubilizers and, in the case of radical polymerization, also radical starters.

"Organic polymer precursors or mixtures thereof" thus denotes all the components which are required to form a polymer network in polar protic solvents.

With regard to the present method according to the invention, the organic polymer particles required are constructed in the reaction solution by monomers and are therefore already present in dispersed form. Silicon compounds contained in the mixture, for example silicon alkoxides having the general formula $Si(OR)_4$ (where R=organic residue) or sodium silicate (after separation of the cations by means of an ion exchanger) form a $SiO_2$ network with water in an acid or base medium. The organic particles are incorporated directly into the inorganic network by means of silicon alkoxides having the general formula $R_nSi(OR')_{4-n}$ (where n=0-3; R, R'=organic residue), which are used as linkers between the organic and the silicate phase. The wet gel obtained is dried at 1 bar and the organic phase is removed by heat treatment in excess of 300° C.

Exemplary embodiment:

Neopentyl glycol diglycidyl ether is converted in ethanol whilst stiffing with diethylenetriamine at 50° C. 3-glycidyloxypropyl trimethoxysilane (GLYMO) is subsequently added and the reaction mixture stirred at 50° C. After cooling, water and a 0.05 mol ammonium hydroxide solution are added to the reaction mixture which is stirred further at 20° C.

Tetraethoxysilane (TEOS) is then added, with further brief stirring, and the mixture is poured into closed vessels at 30° C. for gelification. On completion of gelification the monolith formed is placed in ethanol for 7 days and subsequently dried at 1 bar ambient pressure and 30° C. The xerogel obtained is then pyrolyzed at 550° C. in an inert gas atmosphere (argon) and subsequently heated at 550° C. and in an oxygenated atmosphere.

LIST OF REFERENCE CHARACTERS

1 $SiO_2$ structure
2 Organic component
3 Combustion of organic constituents
4 Preserved imperfection
5 Remaining carbon-containing component

REFERENCES

[WO0001998005591A1]
[EP0690023A2]
[DE3346180C2]
[WO2005068361]

The invention claimed is:
1. A method for producing $SiO_2$ xerogel comprising the steps of:
providing a starting solution containing a silicon compound, the silicon compound comprising at least one of a sodium silicate, a silica, a layered silica, an alkoxysilane and a modified alkoxysilane;
adding organic monomers, the organic monomers being soluble or dispersible in a polar protic solvent, and organically modified alkoxysilanes having the general formula $R_nSi(OR')_{4-n}$ to the starting solution before or after commencement of gelification of the silicon compound, thereby establishing an organic content and a silicate component content in the starting solution, wherein the organic component content is 20% or less by weight of the silicate component content, wherein n=0-3, and wherein R and R' are organic residues;
allowing the silicon compound to gelify, thereby forming a gel with an $SiO_2$-network formed together with organic particles formed in situ by the organic monomers during gelation, wherein the organic particles are chemically and/or covalently bound to the $SiO_2$-network;
drying the gel under subcritical conditions at 1 bar to result in a temporary content by volume of the organic particles between 10% and 60%; and
subjecting the gel to a heat treatment in excess of 300° C. whereby the xerogel has pores having a size from 1000 nm to 50 nm, a density of less than 400 kg/m$^3$ and the organic particles are substantially removed from the gel by pyrolysis so that defect areas are produced in the $SiO_2$-network with resulting carbon residue, produced by the pyrolysis, resulting in a content of chemically weakly bound carbon residues of less than 10%.

2. The method of claim 1, wherein the polar protic solvent is a mixture of water and an alcohol.

3. The method of claim 2, wherein the alcohol is ethanol.

4. The method of claim 1, wherein the silicon compound is selected from the group consisting of sodium silicate, silicas, layered silicates, alkoxysilanes and a modified alkoxysilane.

5. The method of claim 4, wherein the silicas include pyrogenic silicas or precipitated silicas.

6. The method of claim 4, wherein the modified alkoxysilane is $Si(OR)_4$, wherein R is an organic residue.

7. The method of claim 5, wherein the modified alkoxysilane is tetraethoxysilane (TEOS, $Si(OEt)_4$).

8. The method of claim 1, wherein the organic component content is 15% or less by weight of the silicate component content.

9. The method of claim 1, wherein the organic component content is 8% or less by weight of the silicate component content.

10. The method of claim 1, wherein the organic monomers are selected form the group consisting of monomers for resorcinol, phenolic resins, melamine resins or similar formaldehyde resins, epoxides, amines, polyesters, polyimides, and polyurethanes.

11. The method of claim 1, wherein the organic monomers or mixtures thereof polymerize or condense in a same temperature range and/or in a same pH range as the silicon compound.

12. The method of claim 1, wherein the adding step further includes adding catalyst additives and solubilizers.

13. The method of claim 1, wherein the adding step further includes adding radical starters for polymerizing the monomers by radical polymerization.

14. The method of claim 1, wherein the adding step further indicates adding fibers whereby the gel has a fiber content of less than 5% by weight.

15. The method of claim 1, wherein the adding step further includes adding pigments and further additives, and wherein the organic monomers, the pigments, fibers, catalyst additives and the further additives are added after the commencement of the gelification, the gelification being caused by ultrasound treatment or fragmentation.

16. The method of claim 1, further comprising before the heating step pyrolizing the gel in an oxygenated atmosphere at a temperature of above 300° C.

17. The method of claim 1, wherein the silicon compound and the organically modified alkoxysilanes are different.

18. A method for producing $SiO_2$ xerogel, the method comprising:
providing a starting solution containing 3-glycidyloxypropyl trimethoxysilane;
adding organic monomers, the organic monomers being soluble or dispersible in a polar protic solvent, and organically modified alkoxysilanes having the general formula $R_nSi(OR')_{4-n}$ to the starting solution before or after commencement of gelification, thereby establishing an organic content in the starting solution, wherein the organic component content is 20% or less by weight of the silicate component content, wherein n=0-3, and wherein R and R' are organic residues;
allowing the starting solution to gelify, thereby forming a gel;
drying the gel under subcritical conditions at 1 bar to result in a temporary content by volume of organic particles between 10% and 60%; and
subjecting the gel to a heat treatment in excess of 300° C. whereby at least a portion of the temporary content by volume of organic particles is removed so that the xerogel has pores having a size from 1000 nm to 50 nm, a density of less than 400 kg/m$^3$ and a content of chemically weakly bound carbon residues of less than 10%.

19. The method of claim 18, wherein the modified alkoxysilane is $Si(OR)_4$, wherein R is an organic residue.

20. The method of claim 19, wherein the modified alkoxysilane is tetraethoxysilane (TEOS, $Si(OEt)_4$).

21. The method of claim 18, wherein the organic component content is 15% or less by weight of the silicate component content.

* * * * *